United States Patent Office 3,319,773
Patented May 16, 1967

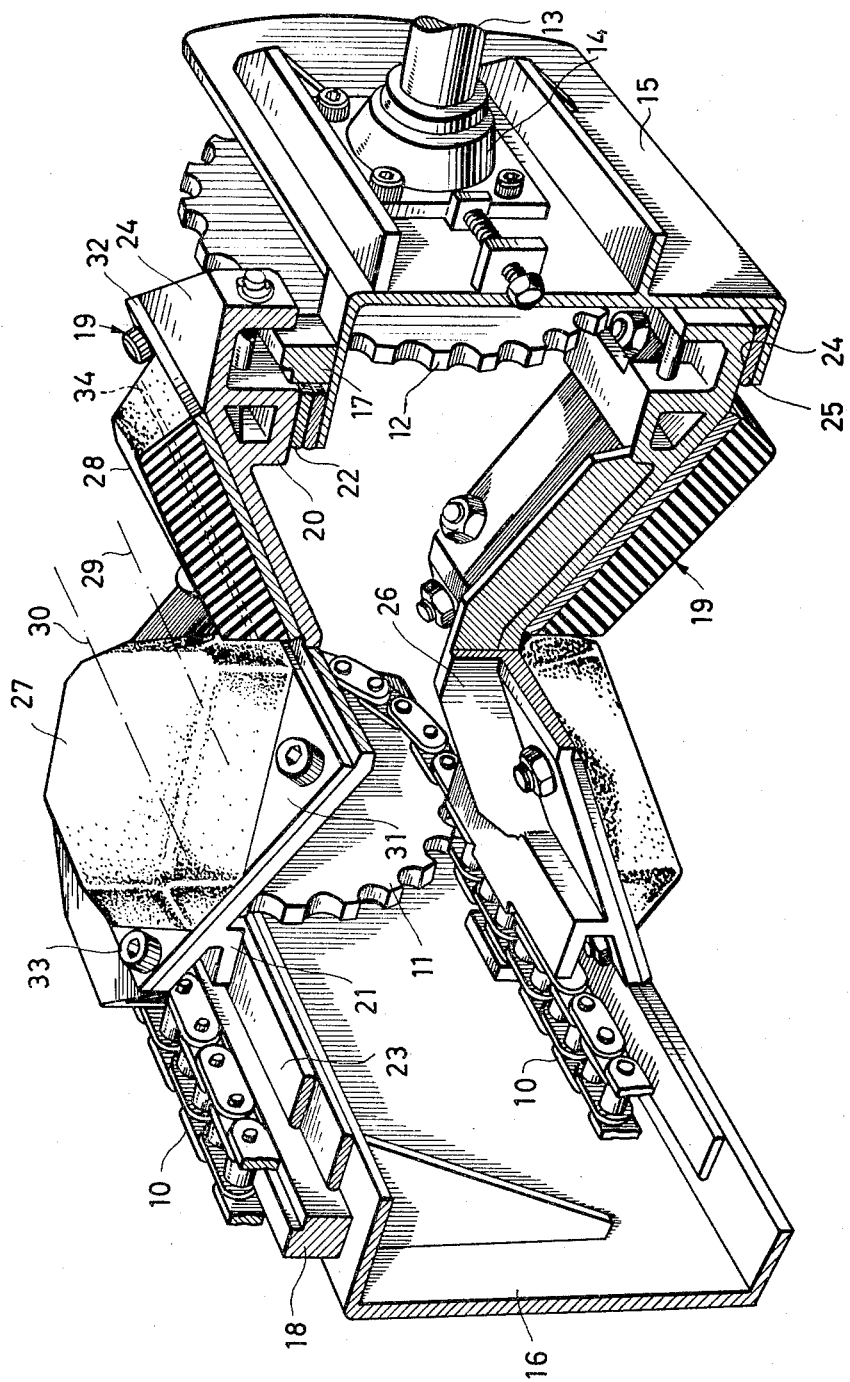

3,319,773
LOG CONVEYOR
Harding Tannerstål, Soderhamn, Sweden, assignor to Soderhamns Verkstaber Aktiebolag
Filed Dec. 7, 1964, Ser. No. 416,296
Claims priority, application Sweden, Jan. 22, 1964, 760/64
2 Claims. (Cl. 198—131)

In wood working machines to which whole logs are fed it is often desirable to carry out the in-feed in such a way that the longitudinal axis of the log will lie as exactly as possible in a predetermined vertical plane, e.g. the vertical longitudinal center plane of a gang saw. For this reason, it is customary to use various kinds of chain conveyors with rigid V-shaped carrying members or rollers conveyors with V-shaped rollers. However, logs often have knots or other protruding irregularities which may engage the carrying members and this causes, firstly, that the position of the log on the conveyor becomes unstable because the log may be carried in a few places only or because the irregularities may easily slip off a carrying member so that the log is displaced or turned and, secondly, that the centering of the log becomes incorrect. The same inconveniences occur if the logs are crooked, which is very common.

The object of the invention is to eliminate the inconveniences just mentioned, and for this purpose the device according to the invention is characterized substantially in that the carrying members which are preferably designed as carrying bridges are provided with supporting blocks of an elastically resilient material disposed in pairs opposite to each other each on one side of the vertical longitudinal center plane of the conveyor and having a resistance to elastic deformation which increases gradually outwardly from the longitudinal center line.

The invention will be described in more detail with reference to the accompanying drawing which shows one end of a conveyor according to the invention in perspective and partly in section.

The conveyor shown as an example has two endless conveyor chains of which only one chain 10 is shown. The chains are disposed in parallel and run over sprockets 11 and 12, respectively, driven in some suitable manner not shown. The sprocket 12 is mounted on a shaft 13 journalled in a bearing 14 on a frame portion 15. The sprocket 11 is similarly journalled in a frame portion 16. The shaft 13 may be common to both sprockets 11, 12 and serve as driving shaft. The upper flights of the two endless chains 10 run each on a guide 17 and 18, respectively, on the upper sides of the frame portions 15 and 16.

At some distance from each other in the longitudinal direction of the conveyor, the chains 10 carry V-shaped carrying bridges generally designated by 19, which are secured in some way not shown. The carrying bridges consists of e.g. welded structures of strong sheet metal and have flanges 20 and 21 for support on supporting or guiding rulers 22 and 23, respectively, while they are in their upper carrying position. The vertical external sides of the flanges 20, 21 are guided by fixed guides, thus preventing movement of the carrying bridegs in the transverse direction of the conveyor. Horizontal, cooperating surfaces 24, 25 have been provided to support the carrying bridges 19 when in their lower position. The bottom side of each carrying bridge may be provided with a bracing flange 26 secured by welding, for instance. So far as hitherto described, the conveyor is of conventional construction.

According to the invention, the carrying bridges 19 are provided with supporting blocks 27, 28 of rubber or some other suitable elastic material. These blocks 27, 28 which are mounted in pairs on each carrying bridge 19 have a resistance to elastic deformation gradually decreasing in the direction towards the vertical longitudinal center plane of the conveyor. In the preferred embodiment shown, this has been achieved by simple means in that the rubber blocks are wedge-shaped as seen from above and have their points facing each other. It will be appreciated that a log of a small diameter will rest against the respective block 27, 28 along a narrow surface portion rather close to the vertical longitudinal center plane of the conveyor, as indicated by the line 29, in which case a comparatively small amount of rubber partakes in the carrying. If the log diameter is larger, the log will be supported by a surface portion at a somewhat greater distance from said longitudinal center plane, as indicated by the line 30, and a correspondingly larger portion of the rubber thus partakes in the carrying. Obviously, the logs will be impresed substantially to the same extent in the rubber blocks independently of the log diameter.

Wherever possible, the blocks 27, 28 have rounded edges to increase their tear resistance, and the sides of the blocks may be inclined so that the bottom surface is larger than the top surface. This inclination of the block sides, which is determined by the requirements in each separate case, results in a progressively increasing resistance in the blocks to elastic deformation by compression.

From the point of view of maintenance and repair it is preferable to mount the blocks 27, 28 easily replaceable on the carrying bridges. For this purpose the blocks in the embodiment shown have been secured by vulcanization or in some other way to plates 31 and 32, respectively, which in turn are secured easily dismountable on the carrying bridges 19 by means of screws 33 or bolts.

Rubber has greater resistance to deformation incompression than in shear, and for some purposes it may be suitable that the professional man utilizes this fact within the scope of the invention in such a way that the blocks 27, 28 absorb the load in combined shear and compression, which is obtained by a suitable design of the blocks and/or by disposing the blocks 27, 28 with an appropriate inclination to the horizontal plane.

To influence the elastic properties of the blocks 27, 28 in the desired direction it may, in some cases, be advisable to provide them with plate-shaped interleaves, in which case the blocks may be designed as so-called laminated rubber metal sandwiches. This possibility is indicated by the metal plate 34 shown diagrammatically.

It is obvious that the device according to the invention particularly involves the advantage that the logs are satisfactorily centered in a vertical plane coinciding with the vertical longitudinal centre plane of the subsequent wood working machine or with any other vertical plane desired. Moreover, the logs get a very stable position because they are always in contact with all the carrying bridges disposed a long the conveyor chains and located along the log so that any risk of displacement or rotation of the log is excluded.

It may be advantageous to the working in the subsequent machine if the logs are fed to this machine with their center lines as closely as possible lying in the same horizontal plane. To achieve this it is customary to use the simple and generally used expedient of separating the logs as far as possible into groups of different ranges of dimension before starting the forwarding operation. However, no complete centering as to elevation is obtained.

The very stable position of the logs during the forwarding operation obtained by the device according to the invention as well as the exact centering of the center lines of the logs in the desired vertical plane have the result that for the first time there is a real sense in providing an elevational adjustment at the exit end of the conveyor in such a way that the center lines of the logs, for instance, are always located in the same predetermined horizontal plane, when the logs leave the conveyor. This means that in many cases important advantages may be gained in connection with the subsequent working, such as a smoother running or a reduced adjustment work in the subsequent machine, for instance. To obtain the elevational adjustment mentioned, the conveyor may, as a whole, be raisable and lowerable, the feed path thus always occupying a predetermined angular position relative to the horizontal plane, for instance in parallel thereto, or the ends of the conveyor may be raised or lowered separately so that the inclination of the feed path relative to the horizontal plane is varied.

The invention has been described above with reference to a conveyor with carrying bridges driven by chains, but of course it is not limited thereto, because the supporting or centering blocks may of course be provided on any other kind of conveyor element, and it will be appreciated that a number of modifications and alterations of details may be made within the scope of the inventive idea.

What I claim is:

1. A log conveyor of the type comprising a plurality of carrying members driven by parallel endless driving chains and following one after the other, said carrying members having an upwardly open V shape for centering the logs in the vertical longitudinal center plane of the conveyor, said carrying members further being provided with supporting blocks of an elastically resilient material mounted in pairs one on each side of the vertical longitudinal center plane of the conveyor, each said supporting block being wedge-shaped as seen from above and disposed with their points adjacent each other in each pair so as to have a resistance to elastic deformation gradually increasing outwardly from the longitudinal center plane, said supporting blocks further being secured to plates by vulcanization, said plates being bolted to the carrying members.

2. A support block for a log conveyor of the type having upwardly open V-shaped elements moved by chains along a conveyor bed, said support block comprising a plate element to be mounted on one side of said V-shaped element, and a resiliently compressible block secured thereto, said resiliently compressible block having a plane surface parallel to said plate element and of a generally wedge shape in plan whereby, when a plurality of said support blocks are mounted in opposing pairs on a plurality of said V-shaped elements with the small ends of each pair of the wedge-shaped resiliently compressible blocks adjacent each other, successive logs of different diameters resting on said blocks will be supported with their longitudinal axes at approximately the same elevation.

References Cited by the Examiner

UNITED STATES PATENTS

| 1,370,663 | 3/1921 | Moon | 198—198 |
| 2,266,506 | 12/1941 | Morse | 144—246.1 |
| 2,792,928 | 5/1957 | Holz | 198—200 |
| 2,794,466 | 6/1957 | Leffler | 144—208 |

FOREIGN PATENTS 848,701  9/1952  Germany.

DONALD R. SCHRAN, *Primary Examiner.*